UNITED STATES PATENT OFFICE.

WILLIAM H. GIBBS, OF CLINTON, MASSACHUSETTS, ASSIGNOR TO GIBBS LOOM HARNESS AND REED COMPANY, OF SAME PLACE.

MODE OF COATING AND FINISHING LOOM-HARNESSES.

SPECIFICATION forming part of Letters Patent No. 237,106, dated February 1, 1881.

Application filed September 15, 1880. (Specimens.)

*To all whom it may concern:*

Be it known that I, WILLIAM H. GIBBS, of Clinton, in the county of Worcester and Commonwealth of Massachusetts, have invented a certain new and useful Improvement in the Process or Mode of Coating and Finishing Loom-Harnesses for Power-Looms; and I do hereby declare that the following is a full, clear, and exact description of the same.

To enable those skilled in the art to which my invention belongs to practice my said improved mode or process in coating and finishing harnesses made from twine for power-looms, I will proceed to describe my said improved mode or process more in detail.

First, the harness is knit from twine, in the usual manner, after which it is placed in a suitable position for receiving the coating about to be described, and which coating is composed, by parts, as follows: Zanzibar gum, two parts; boiled linseed-oil, two parts; india-rubber, dissolved in turpentine, one part; bisulphide of carbon, one part.

Second, the above-named ingredients are mixed in the following manner: The Zanzibar gum is melted in a copper or other suitable vessel, and which melting operation requires a heat of upward of 600°. The boiled linseed-oil is then added and well stirred or incorporated with the melted gum, after which the said mixture may be allowed to cool and be preserved in suitable receptacles for future use, as hereinafter described.

Third, the india-rubber is dissolved in turpentine, about two gallons of turpentine being used to one pound of rubber.

Fourth, the bisulphide of carbon is now mixed with the dissolved rubber, and the two are thoroughly incorporated or mixed together.

Fifth, for use, the mixture of india-rubber and bisulphide of carbon is mixed with the mixture before described, consisting of Zanzibar gum and boiled linseed-oil, in the proportion of two parts of dissolved india-rubber and bisulphide of carbon to four parts of the mixture composed of the Zanzibar gum and boiled linseed-oil, and which mixture, for use, is to be thoroughly stirred.

Sixth, the liquid preparation thus prepared is then applied to the eyes of the harness, and to so much of the heddles above and below the eyes as may be desired, and which application may be made by means of some suitable brush or roll, and after one coating has been applied to the eyes and heddles, as stated, the harness is allowed to stand until the first coating has become suitably "set," and which ordinarily takes about twenty-four hours, before another coating is applied, and I have found for general use three or four coatings, applied in the manner above described, produce the desired result.

Seventh, the harnesses, after having been properly coated and properly set, as before stated, are placed in a steam oven or chamber with a temperature raised to about 236°, where they are allowed to remain for about three hours, after which they are ready for use.

The degree of heat to which the harnesses are subjected, as above stated, is below that which dissolves, separates, and drives off the gelatinous properties of india-rubber, and which gelatinous properties it is important to have retained; otherwise the harness-heddles become brittle and comparatively worthless; consequently the degree of heat to which the harnesses are subjected becomes an important step or element in my said process, and should therefore not exceed the degree of heat hereinbefore stated, thereby insuring the desired flexibility of the harness-heddles and resistance to wear and chafing.

I have described the proportions of the ingredients used which I have found to work or produce the best results; but it will be understood that the proportions may be somewhat varied without departing from the principle of my invention.

The harnesses made by the mode or process above described have been found by practical tests to possess wearing qualities which render the wear of the harnesses from twenty-five to fifty per cent. greater than when the harnesses are prepared or made by the mode or process in use prior to my invention.

The process of subjecting the harnesses to the heat, as above described, after the eyes and adjacent portions of the heddles have been coated, renders the eyes and wearing portions hard and wiry, and that, too, without destroying their flexibility and strength.

Having described my invention, what I claim as new, and desire to secure by Letters Patent, is—

The within-described mode or process of finishing or treating twine heddles of loom-harnesses, consisting of applying to the eyes and adjacent portions a coating composed or compounded of Zanzibar gum, two parts; boiled linseed-oil, two parts; india-rubber dissolved in turpentine, one part; bisulphide of carbon, one part, said parts being incorporated or mixed together, as hereinbefore described, and applied to the eyes and adjacent portions of the harness-heddles, after which the harnesses are placed in a heating-chamber and the temperature raised to about 236° Fahrenheit, where they are allowed to remain about three hours, all substantially as and for the purposes hereinbefore set forth.

WILLIAM H. GIBBS.

Witnesses:
EDWIN E. MOORE,
THOS. H. DODGE.